Jan. 7, 1936.  S. T. WILLIAMS  2,026,926
TIRE VALVE TOOL
Filed Sept. 21, 1933
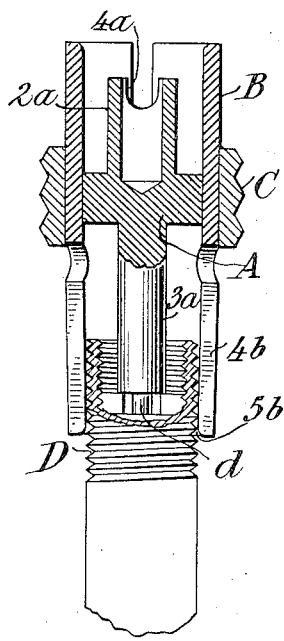
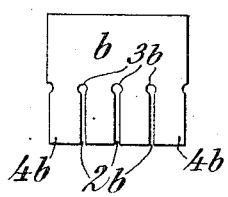
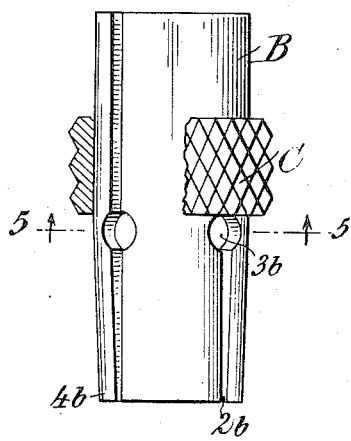
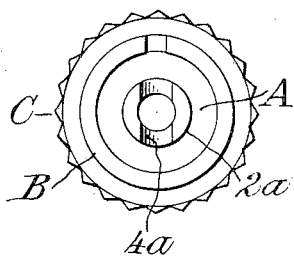
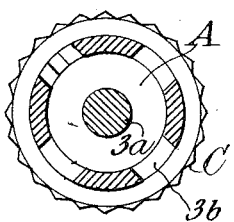
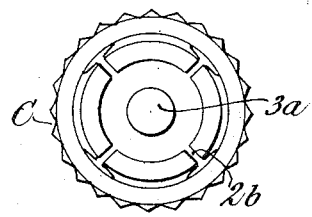
INVENTOR
Selden T. Williams,
BY
Fraser, Myers & Manley
ATTORNEYS.

Patented Jan. 7, 1936

2,026,926

UNITED STATES PATENT OFFICE 2,026,926

TIRE VALVE TOOL

Selden T. Williams, Bellerose, N. Y., assignor to
A. Schrader's Son, Incorporated, Brooklyn,
N. Y., a corporation of New York Application September 21, 1933, Serial No. 690,322

1 Claim. (Cl. 7—1)

The present invention relates to a tire valve tool and more particularly to a combined tire valve deflator and screw-driver, and aims to provide certain improvements in such tool.

The primary objects of my invention are (1) to provide an efficient tool of the class described in a simple and economical manner; and (2) to provide a tool free from objectionable protuberances which will be sturdy and rigid enough not to be easily damaged by careless handling or by being knocked about in a tool box, and small enough to be conveniently carried in a motorist's vest pocket.

The foregoing and other objects of my invention I accomplish by making such tool from three simple parts which may be formed by stamping and screw-machine operations, or otherwise, and readily assembled. Preferably the construction and relationship of parts are such as to permit of their assembly by being force-fitted into assembled relation. The invention will be better understood from the detailed description which follows and from the accompanying drawing showing a preferred embodiment thereof, wherein:—

Figure 1 is an elevation of the device, a part thereof being broken away to better show the construction.

Fig. 2 is an axial section of the tool mounted in operative relation upon a valve stem.

Figs. 3 and 4 show a top plan and a bottom plan view, respectively, of the device.

Fig. 5 shows a section taken along the plane of the line 5—5 of Fig. 1.

Figs. 6, 7 and 8 are elevations of the constituent parts of the device.

Fig. 9 is a plan view of a blank from which the shell shown in Fig. 6 is formed.

The tire valve tool consists of a tool element A, a shell B and a ring C mounted in cooperative relation, as hereinafter more fully described.

The tool element A, which may be designed for any desired purpose, is here shown as intended for use as a tire valve deflator and as a screw-driver for inserting and removing a valve core or insides from a tire valve stem. As shown, it consists of a substantially cylindrical body portion $a$ having reduced, oppositely-directed axial extensions $2a$ and $3a$, the extension $2a$ being hollow and provided at its outer end with a transverse groove $4a$ adapted to engage the conventional lugs on a tire valve core for rotating the same. The extension $3a$ is in the form of a rigid pin adapted to engage the top of a valve pin to depress the same into valve unseating position. The cylindrical surface of the body portion A may be knurled or otherwise roughened for a purpose which will presently be made apparent.

The shell B is preferably formed from a substantially rectangular resilient sheet metal blank $b$ having longitudinal slits $2b$ extending inwardly from one edge and terminating at their inner ends in enlarged circular recesses $3b$ to form a plurality of resilient fingers or tongues $4b$, by rolling said blank into a split sleeve, the resilient tongues $4b$ being turned or bent slightly inwardly from the outer cylindrical form, as best shown in Figs. 1 and 6. The normal internal diameter of the sleeve B is slightly larger than the end D of a tire valve stem with which the tool is to be used and substantially equal in diameter to or slightly less than the diameter of the body portion $a$ of the tool element A, over which it is to engage and be held.

The ring C has an internal diameter somewhat smaller than the normal external diameter of the shell B and is of a height preferably somewhat greater than the length of the body portion $a$ of the element A, and is preferably knurled on its exterior cylindrical surface, as shown at $c$.

The parts A, B and C are assembled in the relationship best shown in Fig. 2, by the ring C being force-fitted over the sleeve B when in encircling relation to the element A to somewhat contract said sleeve into binding holding engagement with said element A. The knurled or roughened surface $a$ on the element A will serve to promote the binding engagement of the sleeve B therewith as the ring C is forced into encompassing relation with respect to the body portion $a$, as shown in Fig. 2.

It will thus be seen that the shell on one side of the clamping ring C is provided with a plurality of inwardly-directed spring fingers $4b$ adapted to engage the threaded nipple end D of a valve stem and frictionally hold thereon while the deflator $3a$ engages and holds the tire valve pin $d$ within said valve stem in valve-unseating position. To facilitate the application of the spring fingers $4b$ over the end of the tire valve stem D, the inner surfaces at the free ends of the spring fingers $4b$ may be rounded or chamfered, as shown at $5b$. The portion of the sleeve B which encloses the screw-driver $2a$ having an internal diameter to freely engage over the threaded end D of the valve stem, will serve as a guide to steady the rotation of the screw-driver $2a$ when inserting or removing a valve core from the valve stem. The knurling on the ring C will serve as an efficient manipulative portion for the tool when either rotating the same or when applying and removing the tool when used as a deflator.

The tool as hereinbefore described, it will be appreciated, is of sturdy and rigid construction and of a size which can be conveniently carried in the pocket of a motorist, the overall length of said tool being approximately one inch, and the overall diameter thereof being one-half inch. It will be further appreciated that the tool elements on the body portion a may be of different character than herein disclosed and also that the various parts may be assembled into their cooperative relation and held therein by means other than that herein specifically disclosed. Hence, it is to be understood that the present invention is susceptible of modification within the scope of the appended claim.

What I claim is:

A tire valve tool comprising a body portion having reduced, oppositely-directed extensions, each formed to serve for cooperation with a tire valve, and a split tubular shell formed of resilient metal encircling said body portion, the end of said shell which encircles one extension being slitted to provide resilient fingers for holding the tool in operative position upon a tire valve stem and the other end of the shell being of a diameter to provide a guide for bringing the other extension in operative position upon a tire valve stem.

SELDEN T. WILLIAMS.